(12) United States Patent
Uhl et al.

(10) Patent No.: US 9,815,004 B2
(45) Date of Patent: Nov. 14, 2017

(54) FILTER WITH A LIQUID DRAIN VALVE

(71) Applicant: MANN+HUMMEL GMBH, Ludwigsburg (DE)

(72) Inventors: Stefan Uhl, Fellbach (DE); Herbert Jainek, Heilbronn (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 255 days.

(21) Appl. No.: 14/120,634

(22) Filed: Jun. 12, 2014

(65) Prior Publication Data

US 2014/0291226 A1 Oct. 2, 2014

Related U.S. Application Data

(63) Continuation of application No. PCT/EP2012/072904, filed on Nov. 16, 2012.

(30) Foreign Application Priority Data

Dec. 9, 2011 (DE) .......... 10 2011 120 646

(51) Int. Cl.
*B01D 29/88* (2006.01)
*B01D 35/153* (2006.01)
*B01D 35/16* (2006.01)

(52) U.S. Cl.
CPC ........... *B01D 29/88* (2013.01); *B01D 35/153* (2013.01); *B01D 35/16* (2013.01); *B01D 2201/0415* (2013.01); *B01D 2201/291* (2013.01); *B01D 2201/4084* (2013.01)

(58) Field of Classification Search
CPC ...... B01D 29/88; B01D 35/153; B01D 35/16; B01D 2201/0415; B01D 2201/291
See application file for complete search history.

(56) References Cited

U.S. PATENT DOCUMENTS

| | | | |
|---|---|---|---|
| 8,282,821 B2 | 10/2012 | Maier et al. | |
| 8,920,649 B2 * | 12/2014 | Loos | B01D 35/153 210/232 |
| 2003/0168390 A1 * | 9/2003 | Jainek | B01D 29/21 210/97 |
| 2004/0232063 A1 * | 11/2004 | Cline | B01D 35/147 210/433.1 |

FOREIGN PATENT DOCUMENTS

| | | | |
|---|---|---|---|
| DE | 19859960 A1 | 7/2000 | |
| DE | 10333398 A1 | 2/2005 | |
| IT | EP 1307247 B1 * | 9/2004 | ........... A61L 31/044 |

* cited by examiner

Primary Examiner — Patrick Orme
(74) Attorney, Agent, or Firm — James Hasselbeck

(57) ABSTRACT

A liquid filter has a hollow-cylindrical filter element is flowed through in a radial direction. The fluid after having passed through the filter element drains in axial direction from the interior of the filter element. A drain plug is disposed at an axial end of the interior of the filter element. The drain plug forms a moveable valve member. A drain passage for draining fluid is open in the open position of the drain plug.

9 Claims, 1 Drawing Sheet

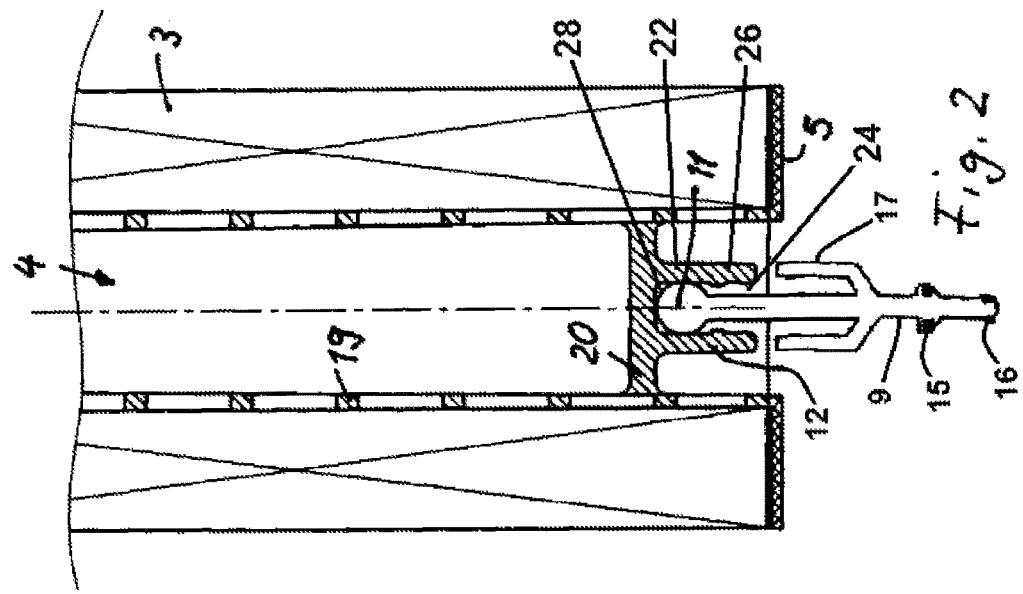
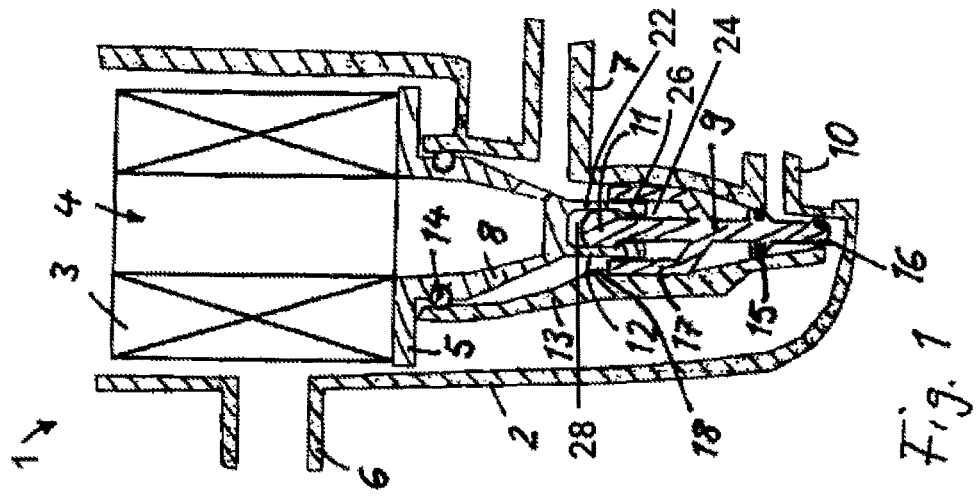

FILTER WITH A LIQUID DRAIN VALVE

CROSS-REFERENCE TO RELATED APPLICATIONS

This application is a continuation application of international application No. PCT/EP2012/072904 having an international filing date of 16 Nov. 2012 and designating the United States, the international application claiming a priority date of 9 Dec. 2011, based on prior filed German patent application No. 10 2011 120 646.2, the entire contents of the aforesaid international application and the aforesaid German patent application being incorporated herein by reference.

BACKGROUND OF THE INVENTION

The invention concerns a liquid filter, in particular an oil filter for an internal combustion engine, comprising a hollow-cylindrical filter element that can be flowed through radially from the exterior to the interior by the fluid to be filtered and has on at least one axial end face an end disk, wherein the cleaned fluid can be axially drained from the interior of the filter element, and further comprising a drain plug at an end face of the interior of the filter element wherein the drain plug forms a valve member and is axially adjustable between a closed position and an open position, and, in the open position, a drain passage for draining fluid is open, wherein the drain plug is connected to the filter element or a component that is fixedly connected to the filter element.

EP 1 307 274 B1 discloses a liquid filter for lubricant oil of an internal combustion engine which comprises a hollow-cylindrical filter element disposed in a filter housing and flowed through in radial direction from the exterior to the interior by the oil to be cleaned. Into the cylindrical interior that constitutes the clean side, a support tube is loosely inserted which is connected with a cover of the filter housing so that, upon removal of the cover, the support tube is also removed from the interior of the filter element.

On the side that is opposite the cover, a valve body of a slide valve is attached to the support tube by means of a snap-on connection wherein the valve body is formed as a rod-shaped oil drain plug that can be adjusted between a closed position and an open position. In normal operation, the oil drain plug is in the closed position in which a drain passage for soiled oil is closed off. Upon opening the cover, the support tube is lifted out of the interior of the filter element and the oil drain plug is adjusted into the lifted open position in which the drain passage is opened for drainage of the soiled oil. Upon further lifting of the cover, the snap-on connection relative to the oil drain plug is released so that only the support tube is removed while the oil drain plug, on the other hand, stays within the filter housing.

SUMMARY OF THE INVENTION

It is the object of the invention to design with simple constructive measures a liquid filter in such a way that upon exchange of the filter element the liquid which is still contained in the liquid filter can be discharged reliably.

This object is solved according to the invention in that the drain plug is secured detachably on the filter element or a component fixedly connected to the filter element. The dependent claims provide expedient further developments.

The liquid filter according to the invention is used in particular in internal combustion engines. For example, the liquid filter can be an oil filter for an internal combustion engine or can be a fuel filter.

The liquid filter comprises in a filter housing a filter element that is inserted exchangeably, is of a hollow-cylindrical configuration, and that is flowed through by the liquid to be cleaned in radial direction from the exterior to the interior. Accordingly, the radial outer surface of the filter element constitutes the raw side, the interior which is usually cylindrical forms the clean side via which the cleaned fluid can be axially discharged. At the end faces of the filter element, end disks are provided which close off the end faces of the filter element fluid-tightly in order to avoid flow short-circuiting between the raw side and the clean side.

So that the liquid that remains upon exchange of the filter element can be discharged from the filter housing through a drain passage, wherein the latter however is closed off when the filter element is inserted, a valve is arranged at one end face of the filter element whose valve member is designed as a drain plug which is adjustable axially between a closed position and an open position. In the open position, a drain passage is opened which serves for discharging fluid which remains within the filter housing after removal of the filter element. In this context, this is a fluid which, at the moment of removal of the filter element, is either contained within the filter housing or in an auxiliary device connected to the filter housing, for example, a radiator, from which upon removal of the filter element fluid flows into the filter housing.

In normal operation, when the filter element is inserted in the filter housing, the drain plug is in the closed position in which the drain passage is closed off. The drain plug is connected with the filter element or with a component that is fixedly connected to the filter element so that upon removal of the filter element from its seat in the filter housing the drain plug is also lifted and is adjusted from its closed position into the open position so that the drain passage is opened. During the removal process of the filter element from the filter housing, the valve is thus opened and residual fluid can drain through the drain passage. As a result of the connection of the drain plug with the filter element, the drain plug is adjusted, independent of the position of the cover placed onto the filter housing, into the open position as soon as the filter element is removed from the filter housing. Accordingly, there is a coupling action between the removal movement of the filter element and the transfer of the drain plug from the closed position into the open position.

According to the invention, the drain plug is detachably coupled with the filter element or with a component that is connected to the filter element. Accordingly, upon removal of the filter element from the filter housing, the drain plug is adjusted from the closed position into the open position, but the drain plug expediently remains arrested in its open position upon further removal of the filter element in that the coupling to the filter element or to the component connected to the filter element is released.

According to a preferred embodiment, the drain plug is attached to one of the end disks of the filter element. The drain plug can be immediately attached to the outwardly positioned end face of the end disk or, according to an alternative embodiment, can be attached to a support element which is fastened on the end disk on the outwardly positioned end face which is facing away from the filter element. The support element is optionally designed monolithic together with the end disk, in particular in an embodiment of injection-molded plastic material, wherein basically also an embodiment with the support element as a separate component is conceivable that is attached to the end disk. The drain plug is located thus outside of the interior of the filter element so that the interior is free of any components projecting into it and flow or axial discharge of the cleaned fluid from the interior is not impaired.

Conceivable is also an embodiment in which in the interior a support structure or support tube is inserted which imparts additional stability to the filter element. The support tube is connected fixedly with the filter element so that upon removal of the filter element from the filter housing the support tube is removed also. When the drain plug is coupled with the support tube, the drain plug in this case is also adjusted from the closed position into the open position upon removal of the filter element.

The drain plug is in particular arranged coaxial to the filter element and extends in axial direction. In case of a support tube integrated into the filter element to which the drain plug is coupled, it is expedient to provide on the support tube a support cross for securing the drain plug. For reasons of symmetry, it may be expedient to have in the area of both axial end faces a support cross on the support tube, respectively, so that a connection with the drain plug is enabled, independent of the mounting direction of the filter element. The coupling action of the drain plug on the support tube can be realized axially within the interior, in the area of the end face, or axially outside of the interior.

The connection between drain plug and filter element or the component connected with the filter element can be realized in various ways. Conceivable is a snap-on connection, possible are however also form-fit or frictional connections or combinations thereof. In case of a snap-on connection, the drain plug is in a locked position on the filter element wherein the snap-on connection is released when a pulling force that is acting on the filter element surpasses a threshold value. This threshold value is preferably reached only once the drain plug has already been moved from the closed position into the open position. Constructively, this can be achieved, for example, in that on the drain plug spreading ribs are arranged which in the open position are supported on a support section which is located in the filter housing or in a guide component for the drain plug connected to the filter housing. In case of a frictional connection, the friction force is also selected to be so high that the transfer of the drain plug from the closed into the open position is performed together with the lifting movement of the filter element and, only in the open position, the friction force of the coupling between the drain plug and the filter element is surpassed upon further removal of the filter element. In case of a form-fit connection, for example, in the form of a bayonet closure, a movement must be carried out which cancels the form fit action, for example, the filter element must be rotated about its longitudinal axis; this is expediently performed only once the drain plug has reached the open position.

BRIEF DESCRIPTION OF THE DRAWINGS

Further advantages and expedient embodiments are disclosed in the dependent claims, the description, and the drawings.

FIG. 1 shows a liquid filter for an internal combustion engine in longitudinal section, comprising a hollow-cylindrical filter element having at its end face an end disk with a monolithically formed support element for a snap-on receiving action of a drain plug that forms a valve member and is adjustable between an open position and a closed position.

FIG. 2 shows a filter element with inserted support tube that adjacent to its end face has a support cross for a snap-on receiving action of a drain plug.

In the figures, same components are identified with identical reference characters.

DESCRIPTION OF PREFERRED EMBODIMENTS

FIG. 1 shows an oil filter 1 for an internal combustion engine comprising a filter housing 2. A hollow-cylindrical filter element 3 is inserted exchangeably into the filter housing 2. The filter element 3 is flowed through in a radial direction from the exterior to the interior by the oil to be filtered and is discharged axially through an interior 4 which forms the clean side. The hollow-cylindrical filter element 3 is closed off at least at one end face by an end disk 5 which has a central cutout which corresponds with the interior 4. Expediently, end disks are arranged at the two axial end faces on the filter element 3.

The oil to be cleaned is discharged through an inflow passage 6 into the interior of the filter housing 2 in which the filter element 3 is flowed through radially from the exterior to the interior. The cleaned fluid is then discharged axially from the interior 4 through the central cutout in the end disk 5 at the bottom and flows through an outflow passage 7 out of the filter housing 2.

A support element 8 is formed monolithically with the end disk 5 and extends on the side of the end disk 5 facing away from the filter element 3 in axial direction downwardly and is a support for a drain plug 9 that forms the valve member of a valve for closing off a drain passage 10. The drain plug 9 is coupled by a snap-on connection with the support element 8. For this purpose, the drain plug 9 has at its topside a spherical head 11 which engages lockingly a locking receptacle 12 at the bottom side of the support element 8. The locking receptacle 12 is formed, for example, by spring tongues that are distributed about the circumference and, upon insertion of the spherical head 11, are elastically spread open until the indicated locked position is reached and the spherical head is secured by a locking force. As shown in FIGS. 1 and 2, a snap-connection may be provided for detachably securing the drain plug onto the filter element, the snap-on connection includes a support element 8 fixed on an axially outer surface of the end disk 5 and preferably formed monolithically with the end disk; a locking receptacle 12 fixed onto the support element 8, the locking receptacle 12 arranged at an axially outer side of the filter element 3. The locking receptacle 12 includes an elastically spreadable locking mechanism 22 of spring tongues 26, the spring tongues 26 elastically spread apart opening into the receiving space 28 through which receiving a head 11 of the drain plug 9 is lockably received into a locked position in the locking receptacle 12. The head 11 of the drain plug, when pushed into the receiving space 28 of the locking mechanism, elastically spreads open the spring tongues 26 such that the head 11 can pass between the spring tongues 26 into the receiving space 28, the elastically spreadable locking mechanism then closing onto the head 11 to lockably mount the drain plug 9 onto the filter element 3.

As an alternative to a snap-on connection, a frictional connection or a form-fit connection of the drain plug 9 at the support element 8 is conceivable also.

The drain plug 9 extends coaxially to the longitudinal axis of the filter element 3 and is axially slidably received in a housing-associated guide element 13. The guide element 13 surrounds with its upper section that is facing the filter element 3 the support element 8. Between the inner side of the guide component 13 and the exterior side of the support element 8 there is a sealing ring 14 for a fluid-tight sealing action so that an undesirable flow between raw side and clean side is prevented.

In the illustrated position according to FIG. 1, the drain plug 9 is in its closed position in which the drain passage 10 which branches away from the filter housing 2 below the outflow passage 9 is closed off. For this purpose, on the drain plug 9 above and below the opening of the drain passage 10, respective sealing rings 15 and 16 are arranged on the drain plug 9. The upper sealing ring 15 and the lower sealing ring 16 are supported respectively on the inner walls of the housing-associated guide component 13 or of the filter housing 2. The upper sealing ring 15 prevents in the closed position of the drain plug 9 that purified oil can drain from above through the drain passage 10. The lower sealing ring 16 prevents that soiled oil coming from the raw side of the filter element or from an auxiliary device, such as an oil radiator, can flow out through the drain passage 10.

Moreover, on the drain plug 9 spreading ribs 17 are arranged which are resting on the inner wall of the guide component 13. The free end face of the spreading ribs 17 points upwardly and is positioned in the closed position of the drain plug 9 with axial spacing relative to a support section 18 at the inner side of the guide component 13. This makes it possible that upon removal of the filter element 3 the drain plug 9 is axially lifted until the spreading ribs 17 contact the support section 18 whereby a further lifting movement of the drain plug 9 is prevented. In this lifted position, the drain plug 9 is in its open position in which the opening of the drain passage 10 is opened and cleaned oil can flow from above and uncleaned oil can also flow from below through the drain passage 10.

Upon a further lifting movement of the filter element 3 for removal from its seat in the filter housing 2, the force with which the filter element 3 is lifted surpasses the locking force with which the spherical head 11 is received in the locking receptacle 12 in the support element 8. Accordingly, the locking connection is released and the filter element 3 can be removed from the filter housing 2 without the drain plug 9. The drain plug 9 remains at its seat in the guide component 13. Upon reinsertion of a filter element which has an appropriate locking geometry, the spherical head 11 on the drain plug 9 will again engage with a snap-on connection the locking receptacle 12 on the support element 9 and is adjusted in downward direction into the closed position.

In the embodiment according to FIG. 2, in the interior 4 of the filter element 3 a support structure or support tube 19 is inserted that lines the inner wall of the filter element and is connected fixedly with the filter element. A support cross 20, monolithic with the support tube 19, is arranged adjacent to the end face which is closed off by the end disk 5 and is provided with a locking receptacle 12 into which the spherical head 11 of the drain plug 9 projects lockingly. The function corresponds to that of the first embodiment according to FIG. 1. In the regular operating position, the drain plug 9 is in the closed position in which a drain passage in the filter housing is closed off. Upon axial lifting of the filter element for removal from the filter housing, due to the locking connection of the drain plug 9 with the support cross 20, the drain plug is axially lifted and is moved into the open position in which the drain passage is open. In the following, upon further removal of the filter element 3, the locking connection between the spherical head 11 and the locking receptacle 12 is canceled so that only the filter element can be removed from the filter housing and the drain plug remains in the filter housing.

While specific embodiments of the invention have been shown and described in detail to illustrate the inventive principles, it will be understood that the invention may be embodied otherwise without departing from such principles.

What is claimed is:

1. A liquid filter comprising:
   a hollow-cylindrical filter element adapted to be flowed through in a radial direction from an exterior of the filter element to a hollow interior of the filter element by a fluid to be filtered,
   wherein the fluid after having passed through the filter element drains in an axial direction from the interior of the filter element;
   the filter element having axial end faces;
   the filter element comprising an end disk on at least one of the axial end faces and having a central flow opening;
   a drain plug disposed at an exterior of the filter element at an axial end of the filter element and aligned radially with the hollow interior of the filter element;
   the drain plug forming a valve member and adapted to be axially adjusted between a closed position and an open position;
   a drain passage for draining fluid, wherein the drain passage is open in the open position of the drain plug;
   the drain plug detachably connected by a snap-on connection to the filter element, the snap-on connection arranged on the end disk at an exterior of the filter element and arranged radially aligned with the hollow interior to the filter element;
   wherein a central portion of the end disk forms a support element having a first end fixed directly onto an axially outer surface of the end disk on the central flow opening and formed monolithically with the end disk and arranged radially aligned with the hollow interior of the filter element, the support element extending axially outwardly away from the filter element to an opposing second end of the support element arranged outside of the filter element;
   wherein the end disk forms a plurality of elastically spreadable spring tongues on the opposing second end of the support element, the plurality of spring tongues distributed about a circumference of a receiving space, the plurality of spring tongues configured to elastically spread apart to receive a head of the drain plug into the receiving space;
   wherein the plurality of elastically spreadable spring tongues and receiving space form a locking receptacle, the locking receptacle arranged at an axially outer side of the filter element;
   wherein the plurality of spring tongues form an elastically spreadable locking mechanism, that closes on the head in the locking receptacle forming the snap-on connection lockably mounting the drain plug onto the end disk of the filter element.

2. The liquid filter according to claim 1, wherein the drain plug is fastened on the end disk.

3. The liquid filter according to claim 1, wherein the drain plug is form-fittingly connected to the filter element or to a component that is fixedly connected to the filter element.

4. The liquid filter according to claim 1, further comprising
   a filter housing in which the filter element is disposed, wherein the filter housing comprises a guide component and
wherein the drain plug is guided in the guide component.

5. The liquid filter according to claim 4, wherein
the drain plug comprises spreading ribs that, in the open position, are supported in a support section of the guide component.

6. The liquid filter according to claim 1, wherein
the support element is arranged radially aligned with the hollow interior of the filter element, the support element having a hollow interior forming a flow passage continuation of the hollow interior of the filter element.

7. A liquid filter, comprising:
a hollow-cylindrical filter element adapted to be flowed through in a radial direction from an exterior of the filter element to a hollow interior of the filter element by a fluid to be filtered,
wherein the fluid after having passed through the filter element drains in an axial direction from the interior of the filter element;
the filter element having axial end faces;
the filter element comprising an end disk on at least one of the axial end faces and having a central flow opening;
a drain plug having a head, the drain plug disposed at an axial end of the interior of the filter element and aligned radially with the hollow interior of the filter element;
the drain plug forming a valve member and adapted to be axially adjusted between a closed position and an open position;
a drain passage for draining fluid, wherein the drain passage is open in the open position of the drain plug;
a support tube arranged in the interior of the filter element and fixedly connected to the filter element, the support tube including:
    a first support cross arranged in an interior of the support tube and having a leg extending radially across the interior of the filter element, the first support cross arranged adjacent or proximate to one of the axial end faces of the filter element, the leg fixed at opposing ends onto radially opposing inner sides of the support tube;
a locking receptacle fixed onto an axially outer side of the first support cross and forming a snap-on connection, the locking receptacle including:
    a plurality of elastically spreadable spring tongues formed directly on the first support cross in an interior of the support tube, the plurality of spring tongues distributed about a circumference of a receiving space, the plurality of spring tongues configured to elastically spread apart to receive a head of the drain plug into the receiving space;
    wherein the plurality of spring tongues form an elastically spreadable locking mechanism, that closes on the head in the locking receptacle forming the snap-on connection lockably mounting the drain plug onto the filter element;
    wherein the head, when pushed into the receiving space, elastically spreads open the plurality of spring tongues such that the head can pass into the receiving space, the elastically spreadable locking mechanism then closing onto the head to lockably mount the drain plug onto the filter element.

8. The liquid filter according to claim 7, further comprising
a filter housing in which the filter element is disposed,
wherein the filter housing comprises a guide component and
wherein the drain plug is guided in the guide component.

9. The liquid filter according to claim 8, wherein
the drain plug comprises spreading ribs that, in the open position, are supported in a support section of the guide component.

* * * * *